(12) United States Patent
Goertz et al.

(10) Patent No.: US 8,505,373 B2
(45) Date of Patent: Aug. 13, 2013

(54) DEVICE AND METHOD FOR DETERMINING THE INTERTIAL PARAMETERS OF A BODY

(75) Inventors: Harald Goertz, Tuebingen (DE); Jan Strauch, Luebeck (DE); Boris Peter, St. Gallen (CH)

(73) Assignee: Rheinisch-Westfaelische Technische Hochschule, Aachen (DE)

( * ) Notice: Subject to any disclaimer, the term of this patent is extended or adjusted under 35 U.S.C. 154(b) by 776 days.

(21) Appl. No.: 12/443,831

(22) PCT Filed: Jul. 11, 2007

(86) PCT No.: PCT/EP2007/006142
§ 371 (c)(1),
(2), (4) Date: Dec. 23, 2009

(87) PCT Pub. No.: WO2008/043401
PCT Pub. Date: Apr. 17, 2008

(65) Prior Publication Data
US 2012/0324991 A1   Dec. 27, 2012

(30) Foreign Application Priority Data

Oct. 6, 2006   (DE) .......................... 10 2006 047 787

(51) Int. Cl.
   *G01M 17/00*   (2006.01)
(52) U.S. Cl.
   USPC ..................................... 73/116.01
(58) Field of Classification Search
   USPC ......... 73/488, 65.08, 116.01, 116.02, 117.01, 73/117.02, 117.03
   See application file for complete search history.

(56) References Cited

U.S. PATENT DOCUMENTS 5,814,959 A * 9/1998 Nonaka et al. ........... 318/568.11
7,278,295 B2 * 10/2007 Mastinu et al. .............. 73/65.08

FOREIGN PATENT DOCUMENTS

DE   4317058   11/1994

OTHER PUBLICATIONS

Niebergall, M. et al., "Identification of the Ten Inertia Parameters of a Rigid Body", 1997, Nonlinear Dynamics, Kluwer Academic Publishers, pp. 361-372.*

* cited by examiner

*Primary Examiner* — Helen Kwok
(74) *Attorney, Agent, or Firm* — Andrew Wilford (57) ABSTRACT

The invention relates to a device for determining the inertial parameters of a body, particularly a motor vehicle. Said device comprises a receiving platform (P) on which the body (F10) can be placed. The receiving platform (P) is provided with a central, especially spherical joint (G00) about which the receiving platform (P) can be moved with three degrees of freedom (x, y, z) by means of drive units (Z1, Z2, Z3). The invention further relates to a method for determining the inertial parameters of a body, particularly by means of a device disclosed in one of the preceding claims. In said method, a control system is provided which allows a receiving platform (P) and a body (F10) mounted thereon to be moved about a central pivot (G00) with three degrees of freedom (x, y, z). The forces measured in the joints (G00, G20) and the angles measured in the central joint (G00) are fed to an evaluation process, by means of which the inertial parameters of the body (F10) are determined especially by using laws of mechanics, particularly the principle of angular momentum.

17 Claims, 11 Drawing Sheets

$$\left[ \begin{array}{c} -m \cdot \underline{T}^{IK} \cdot \tilde{r}_{SP}^{K} \\ \underline{J}_{S}^{K} + m \cdot \left( \left( \underline{r}_{SP}^{K\,T} \cdot \underline{r}_{SP}^{K} \right) \cdot I_{3} - \underline{r}_{SP}^{K} \cdot \underline{r}_{SP}^{K\,T} \right) \end{array} \right] \cdot \underline{\dot{\omega}}^{K} =$$

$$\left[ \begin{array}{c} \sum_{i} \underline{F}_{i}^{I} + \underline{F}_{G}^{I} \\ \sum_{i} \underline{M}_{i}^{K} + \sum_{i} \left( \tilde{r}_{P i P}^{K} \cdot \underline{F}_{i}^{K} + \tilde{r}_{SP}^{K} \cdot \underline{T}^{IK} \cdot \underline{F}_{G}^{I} \right) \end{array} \right] - \left[ \begin{array}{c} m \cdot \underline{T}^{IK} \cdot \tilde{\omega}^{K} \cdot \tilde{\omega}^{K} \cdot \underline{r}_{SP}^{K} \\ \tilde{\omega}^{K} \cdot \left( \left( \underline{J}_{S}^{K} + m \cdot \left( \left( \underline{r}_{SP}^{K\,T} \cdot \underline{r}_{SP}^{K} \right) \cdot I_{3} - \underline{r}_{SP}^{K} \cdot \underline{r}_{SP}^{K\,T} \right) \right) \cdot \underline{\omega}^{K} \right) \end{array} \right]$$

Variables of the above equation:

$\underline{M}_{i}^{K}$    Vector of the i outer moment relative to the body system K $\underline{F}_{i}^{I}$    Vector of the i outer force relative to the inertial system $\underline{F}_{G}^{I}$    Vector of the weight to the inertial system I.

$\underline{T}^{KI}$    Transformationsmatrix zur Transformation vom Inertialsystem I in das körperfeste System K.

$\underline{r}_{SP}^{K}$    Vector of the center-of-mass coordinates from reference point P to the center of mass S relative to the body system K $\underline{\omega}^{K}$    Angular velocity vector relative to the coordinate system K of the body where $\tilde{\omega}^{K}$ represents the skew-symmetrical matrix.

$\underline{\dot{\omega}}^{K}$    Vector of the angular acceleration relative to the coordinate system K of the body $I_{3}$    Unit matrix of $IR^{3,3}$

*Fig. 9*

Explanation of the inertial parameters of the above equation:

| Inertial parameter | Formula | Description |
|---|---|---|
| Mass (scalar) | $m$ | Size of mass (1st parameter) |
| Schwerpunkt (Vektor) | $r_{SP}^{K} = \begin{bmatrix} r_{SP_x}^{K} \\ r_{SP_y}^{K} \\ r_{SP_z}^{K} \end{bmatrix}$ | Three coordinates of the center of mass as coodinates in the body system (2d-4th parameters) |
| Inertial tensor (Tensor 2d step) | $J_{S}^{K} = \begin{bmatrix} J_{S_x}^{K} & -J_{S_{xy}}^{K} & -J_{S_{xz}}^{K} \\ -J_{S_{yx}}^{K} & J_{S_y}^{K} & -J_{S_{yz}}^{K} \\ -J_{S_{zx}}^{K} & -J_{S_{zy}}^{K} & J_{S_z}^{K} \end{bmatrix}$ | Three mass inertial moments ($J_{S_x}^{K}, J_{S_y}^{K}, J_{S_z}^{K}$) and three deviation moments ($J_{S_{xy}}^{K} = J_{S_{yx}}^{K}, J_{S_{xz}}^{K} = J_{S_{zx}}^{K}, J_{S_{yz}}^{K} = J_{S_{zy}}^{K}$). Inertial parameters are related to the center of mass S and shown in the body system K (5th-10th parameters) |

*Fig. 10*

DEVICE AND METHOD FOR DETERMINING THE INTERTIAL PARAMETERS OF A BODY

CROSS REFERENCE TO RELATED APPLICATIONS

This application is the US national stage of PCT application PCT/EP2007/006142, filed 11 Jul. 2007, published 17 Apr. 2008 as WO2008/043401, and claiming the priority of German patent application 102006047787.1 itself filed 6 Oct. 2006.

BACKGROUND OF THE INVENTION

The invention relates to an apparatus for determining the inertial parameters of a body, in particular a motor vehicle or motor-vehicle part. The invention furthermore relates to a method of determining the inertial parameters of a body.

FIELD OF THE INVENTION

Within the scope of this invention, based on a Cartesian coordinate system the inertial parameters are understood to be essentially ten parameters that are given for a body, in particular an arbitrary rigid body, through the mass, the position of the center of mass in the three possible space coordinates, the three principal moments of inertia with regard to the three respective directions in space as well as the three so-called products of inertia, which describe the reciprocal influence of the three directions in space among one another.

The meaning and purpose of the determination of these inertial parameters is for example a need in the simulation of the dynamic vehicle behavior in vehicle development as well as, for example, also in the development of the dynamic drive controllers that are used in motor vehicles. The simulation models used for developing dynamic drive controllers require as a basis the inertial parameters. Furthermore, quite generally the inertial parameters of arbitrary dynamically moved bodies can be of interest.

The determination of inertial parameters of an arbitrary body is fundamentally known in the prior art. The known methods or apparatuses, however, can generally be used hereby only to a restricted extent and permit the determination of the inertial parameters in part only after corresponding alterations of the apparatus.

OBJECT OF THE INVENTION

The object of the invention is to provide an apparatus and a method with which the inertial parameters, in particular all ten of the above-mentioned inertial parameters, of an arbitrary body and preferably of a motor vehicle can be measured, in particular by an automated program run and a structurally simplified apparatus.

SUMMARY OF THE INVENTION

This object is attained in that the apparatus for determining the inertial parameters of a body, in particular of a motor vehicle, comprises a support platform on which the body can be positioned, the support platform having a central, in particular spherical joint around which the support platform can be moved in three degrees of freedom by drives.

The invention is further attained through a method in which a control system is provided that can move the support platform and a body, such as, for example, a motor vehicle, attached thereto in three degrees of freedom around a central rotation point, the measured angles in the joints on which the drives act being fed to an evaluation unit with which the inertial parameters of the body are determined, in particular through the application of laws of mechanics, such as, for example, the principle of conservation of angular momentum.

The basis of the invention is hereby that the movement of a body, such as, for example, a motor vehicle, can be described in three translational as well as three rotational degrees of freedom through general equations of motion. If for an observed sequence of motions with low angular velocities of the movement gyroscopic torques are negligible and if the test specimen has no or essentially no products of inertia, with the application for is example of the principle of conservation of angular momentum, the three component equations for the rotation of the body about its center of mass are independent of one another.

The influence of a moment about an arbitrary axis then results in only one accelerated rotary motion about precisely this axis without an interaction on other axes occurring. According to the invention a favorable sequence of motions is thus seen in achieving rotationally accelerated components of motion about three independent axes.

The invention achieves this in that a support platform is provided having a central, in particular spherical joint, so that movement about three arbitrary axes, for example the axes of a Cartesian coordinate system, is possible about a rotation point defined by the central, in particular spherical, joint. The term spherical joint hereby means the type of joint with which a rotation about a defined point occurs, regardless of how the joint is constructed. It can thus be, for example, a ball joint or also a Cardan joint as well as also other joints that render possible spherical movements around a defined point.

This construction results in a structure in which three drives can act on the support platform corresponding to the three selected degrees of freedom, in particular which form a base in the mathematical sense whose lines of action do not run through the central joint, designed, for example, as a Cardan joint. With this construction around the central joint, at least within stipulated angular ranges, an arbitrary rotational movement can thus be realized.

The construction can be embodied, for example, such that the support platform is connected via the central joint to a drive frame on which at least three drives are mounted, in particular three drives operating in a hydraulic and preferably linear manner, which act on the support platform in joints at a spacing from the central joint. The drives are hereby preferably likewise attached in joints to the drive frame.

The central joint thus connects the support platform to the drive frame, wherein the desired movements can be achieved via the three drives. As states above, these drives can be embodied, for example, as hydraulic linear drives or also as servomotors, pneumatic drives or the like. In particular with the embodiment as hydraulic drives, they can be realized as an actuatable piston-cylinder arrangement, wherein here preferably the cylinder-side attachment to the drive frame and a piston-side attachment to the support platform is provided. Likewise a reversed arrangement is possible here in principle.

To realize a particularly compact structure, it can thereby be provided that (only) two action points/joints are provided for the (three) drives on the support platform, with two drives acting on a common action point or a common joint. Thus with this embodiment pm the drive frame there are three mounting points for attaching the drives and on the support platform two mounting points, with in a preferred embodiment the central joint forming the origin of a coordinate system and the two action points/joints provided according to the invention being on a coordinate axis running through the selected origin.

The common joint on which two drives act, together with the central joint, which forms the origin for example can thus lie on a axis in an X direction, about which a pure tilting by a third drive is possible, which has its action point or pivot point on a Y axis running through the central joint and preferably perpendicular to the X axis. Only the actuation of this corresponding third drive is necessary for this.

A tilting about the Y axis thus defined between central joint and the pivot point of the third drive can be carried out through a displacement upward of the common action point, which can be carried out through a simultaneous actuation of the two further drives acting on this point. It can preferably be provided for this that the two drives are actuated simultaneously and with the same step widths or the same deflections.

A rotation around a vertical axis (yaw axis) in the Z direction, which runs essentially perpendicular to a support platform aligned horizontally and stands preferably perpendicular to the plane that is spanned by the above-described X and Y axes, can be carried out in that all three drives are operated simultaneously. Thereby two of the drives, namely those that are articulated on the common action point on the support platform, are moved essentially in particular approximately in the opposite direction, wherein it must be ensured that the pivot point of the further third drive remains inside the plane of the support platform, for which this performs a correcting movement, which essentially compensates the radial tilting around the drive frame-side pivot point of this drive.

Thus through an actuation of these three drives, such as for example hydraulic drives, by a control system provided for this, an arbitrary rotation at least in certain angular ranges about the rotation point defined by the central joint is possible.

Based on the two drives that are articulated on a common joint or on the common action point on the support platform, it can be provided that the forces applied by these two drives, which act for example with a hydraulic linear drive in the direction of a piston axis, are mounted at an angle to one another, in particular at an angle of less than 90° based on the horizontal position of the support platform. An angle of 84° in the horizontal position can be preferably selected for this, for example. This has the advantage that in all angular ranges with a rotation about the Y axis described above the two drives or the vectors of the forces generated by them can generate a sufficiently large force component in the Z direction or with arbitrary positions of the support platform perpendicular thereto.

With the construction according to the invention it can furthermore be provided that the central joint is provided below the support platform surface, in particular in the center of mass or, however, on a line through the center of mass oriented perpendicular to the plane of the support platform.

For the determination of the inertial parameters it can furthermore be provided in the construction that each of the joints comprises at least one force sensor/load transducer, with which the force, in particular the weight, acting in the joint can be measured. Furthermore, at least the central joint comprises at least one angular motion detector that responds to angular movements in all three degrees of freedom. For example, the central joint, if it is designed as a Cardan joint, can comprise three angular motion detectors, namely a respective angular motion detector for each of the three independent axes, with which angular motion detector an angular movement around the respective axis can be measured.

Thus in the execution of a method to determine the inertia parameter the essential values, namely on the one hand the angles of rotation generated during the rotation and on the other hand the respective forces can be detected and measured. For this the parameters measured, that is the angles and the acting forces, can be inserted in the equations of motion using, for example, the principle of conservation of angular momentum, and, based on the respective marginal conditions applicable, a solution for the value of interest, that is with respect to the inertial parameters, can take place.

In particular with the embodiment of the central joint as a Cardan joint with three independent rotation axes, the three Cardan angles can be directly measured by the referenced angular motion detectors. There is further the possibility here of also forming the time differentiation of these values, whereby information on the angular velocity as well as the angular acceleration is obtained, which can be included in the calculation.

The forces and moments further acting with the movements selected, which forces and moments occur, for example, through the gravity and the inertia of the body observed for example a motor vehicle, can be recorded with the embodiment according to the invention through the force sensors/load transducers provided in the joints or also those provided in the drives, for example, the cylinders of hydraulic drives.

Possible friction moments occurring hereby in the joints can thereby be considered primarily as negligible and usually represent a systematic error which optionally can be taken into account correctively. Forces and acting torques, which possibly could arise through air friction of the test specimen, are in particular regarded as negligible when the set angular velocities are sufficiently low. In particular with oscillating movements less than two hertz, preferably of one hertz or less than one hertz, this effect can be disregarded.

To measure the acting forces inside the common joint or the common action point at which two drives are articulated simultaneously, a triaxial force sensor can be provided, in order to be able to record the respective forces in three directions in space.

In a further structural embodiment it can be provided that the central joint can be locked by a latch, in particular wherein a locking in the horizontal position of the support platform can be provided. This makes it possible for an arbitrary body, such as, for example, a motor vehicle, in the horizontal position of the support platform first to be positioned thereon and attached thereto, without hereby possibly acting forces acting on the joints of the drives and the force sensors located therein. Joints and force sensors can thus be protected from possible damage that can occur through shocks. The latch can be released only for the actual measurement phase so that then the load located on the support platform is distributed over the pivot points (joints) and the drives provided thereon.

It can furthermore be provided here that a body whose inertial parameters are to be measured, is not loose on the support platform, but is preferably secured. In particular with a motor vehicle one or more fixed connections are provided between the support platform and the motor vehicle door sill or sills. There is thus also the possibility of holding a motor vehicle on the support platform in a defined deflection state of the wheels or the absorbers and springs mounted thereon. Thus oscillating masses moved while making measurements, which for example would be formed by freely hanging wheels, are avoided. A motor vehicle can also thus be measured in its customary position of use or other arbitrary deflection positions.

The above-described common joint, in which two of the total of three drives are pivoted on the support platform, can be made such that it has coaxially with its axis of rotation (for example, the X axis) a part connected to the support platform, a joint part assigned to the drive side and a force sensor mounted between them and connecting these parts, with on the joint part two coaxial bearing bushings being pivoted at the axis of rotation and each connected to one of the drives. The force sensor can measure the forces acting in three axial directions.

The central joint for its part can have a mounting platform, which is essentially connected to the support platform and to which or in which a first bearing plate is mounted coaxially rotatable around a vertical axis. This vertical axis can form the vertical axis or yaw axis (e.g., Z axis of the described apparatus). It can hereby be provided that the first bearing plate is connected to a second bearing plate via a load transducer, wherein the second bearing plate is connected via two axes perpendicular to the vertical axis by a cardan joint to the drive frame. This thus results in an overall Cardan bearing over three axes in which at the same time a load transducer is integrated, in particular in order to measure the weights acting parallel to the vertical axis. It can be particularly preferably provided hereby that the three rotational axes oriented perpendicular to one other of the joint embodied as a Cardan joint intersect at a common point that is provided in the center of the load transducer.

This joint arrangement can hereby have its own angle sensor for each of the three independent Cardan axes.

The measuring method can be carried out such that, for example, in a first step the body is held statically, in particular in the horizontal position of the support platform, and the proportional weight of the body is measured in each of the joints. The entire weight of the body can thus be determined, for example, through the summation of the forces measured in the joints. Taking into account the applicable gravitational acceleration, the mass of the body can then be deduced.

In this situation the observed equation of motion (principle of conservation of angular momentum) is simplified, for example, through the marginal conditions that are given through the idle condition, that namely the current angular velocity as well as the angular acceleration are equal to zero. Thus a static force balance equation results and the weight vector can be determined through the sum of the individual force vectors measurable in the individual pivot points.

Hereby on the one hand the force acting in the central joint can be recorded through the previously described force measurement apparatus provided in this central joint. The force sensor, in particular designed in a triaxial manner, provided here can be used to measure the force acting in the common joint. The pin force that acts on the third drive in its pivot point on the support platform can either be likewise directly measured or determined through the actuator force applied, which is applied to maintain the horizontal position.

Furthermore, in particular based on a coordinate system at whose origin the central joint is provided, from the position of the joints with respect to one another and the weights measured in each joint, the position projected in the plane of the support platform of the center of mass of the body located on the support platform can be determined. The positions of the joints can be unequivocally determined through the coordinate system, since the central joint forms the origin and the two further action points or joint positions are provided at a predetermined spacing exactly on the two coordinate axes lying in the platform plane.

Thus from a knowledge of these values, which were determined through a first static measurement, at least the location is determined where the center of mass vector acts in the platform plane. After this step, however, hitherto the spacing of the centers of mass above the platform plane or the spacing from the origin of the coordinate system and thus the direction and the length of the center of mass vector has remained unknown.

This unknown value can be determined, for example, in that the support platform is tilted in a predetermined angular range in at least one of the degrees of freedom from the horizontal position. This can thus preferably be a tilting either about the X or the Y axis. During tilting, which is preferably carried out in a quasi-static manner, that is with slow angular velocities to the measured angles, the center of mass position in the platform plane is hereby redetermined, as described above. The height of the center of mass above the support platform and the position of the origin can thus be determined from the angle-dependent shift of the center of mass inside the support platform plane. The center of mass vector is thus then known as a whole.

For the further method of determining the inertial parameters, with a knowledge of the center of mass position, the support platform can then be rotated about the three axes, in particular successively one after the other and in particular oscillating in a predetermined angular range of, for example, ±5°, wherein in each of the joints the acting forces are recorded and in the central joint the angle or angles are determined, wherein then from these measured values, knowing the mass and center of mass position previously determined and the given marginal conditions, the inertial parameters, namely here in particular the inertia matrix, with the principal moments of inertia regarding the respective axes and the products of inertia are determined.

BRIEF DESCRIPTION OF THE DRAWING

An illustrated embodiment of the invention is described in more detail in the following figures. Therein.

DETAILED DESCRIPTION OF THE DRAWING

Figure 1:
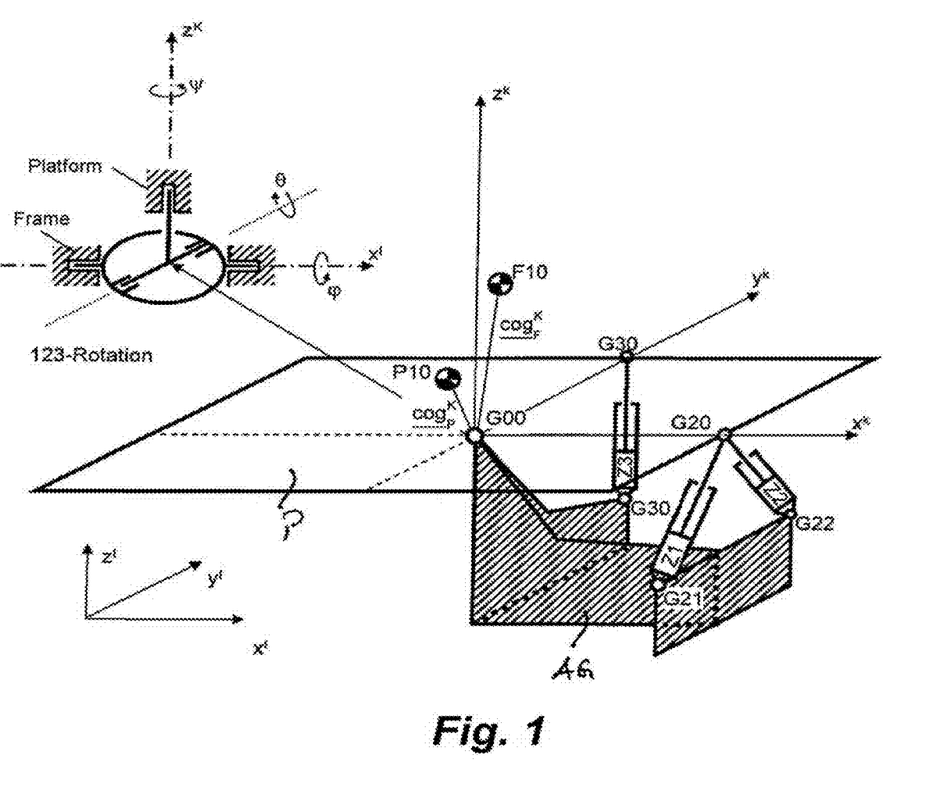
FIG. 1 is a simplified view of the apparatus according to the invention.

FIG. 1 shows a diagrammatic view of the apparatus according to the invention. A support platform P is shown that serves to carries a body, for example, a motor vehicle, and is connected via a central joint G00 to a drive frame AG provided beneath it. This central joint can have for example a Cardan joint with three axes that intersect at a common point so that spherical movement of the support platform P around the central joint is possible.

The equations of motion that are used to determine the inertial parameters based on a measuring method, such as, for example, based on the principle of conservation of angular momentum, use two points to describe the spatial movement. These are the center of mass F10 of an assumed vehicle parked on the support platform and a reference point P10 of the support platform. This can essentially be the center of mass of the support platform. This can preferably be in the central joint.

To carry out a measuring method and to use the equations of motion preferably and to simplify these equations of motion, marginal conditions can be assumed, such as for example that forces that act through the aerodynamic drag as outer forces on the body to be examined are assumed to be negligibly small.

It can likewise be assumed that the friction in the joints or between the individual joint members is negligible. It can furthermore be assumed that the individual joint members of the apparatus according to the invention are ideally rigid, that there is therefore no drift and no hysteresis.

The body to be examined, such as for example a motor vehicle can be assumed to be a rigid body. This can be achieved based on a motor vehicle here with this apparatus in particular in that the vehicle and the support platform are secured together such that relative movement between the wheels and the apparatus according to the invention is suppressed. The motor vehicle can thus be fixed on the platform in a specific deflection state of the wheels.

Through suitably selected sequences of motion, such as for example, oscillating to and fro movement about one or more axes, in particular successively one after the other, the measured angles and forces and the determined mass can be included in the equations of motion and these solved according to the desired inertial parameters. It is preferably provided hereby that the drives, which can be a hydraulic, perform approximately quasi-stationary sequences of motion so that particularly with oscillating movements frequencies of about 1 hertz take place. However, with the above-described apparatus highly dynamic sequences of motion with considerably higher oscillations or also lower frequencies can also be performed.

In FIG. 1 the individual pivot points that connect the drive frame AG to the support platform or the drive platform AG to the drives and these to the support platform are labeled with the letter G, the subsequent number indicating the respective position of the joint. As described above, the respective joint positions, in particular G00, G20 and G30 are embodied as described below.

A tilting of the X body axis, that is the one defined by the axis G00-G20, is hereby effected by actuation of the drive Z3 located between the pivot points G30. A tilting about the Y axis, however, is achieved by a simultaneous and in particular with the same movement width actuation of the drives Z1 and Z2, so that the common pivot point G20 rotates about the origin G00 with respect to the axis G00-G30.

If rotation about the vertical axis Z is to be achieved here, all of the drives Z1, Z2 and Z3 are simultaneously actuated, the actuation of Z1 and Z2 being carried out essentially in the opposite direction, that is for a counterclockwise rotation Z1 is extended and Z2 retracted, while at the same time a compensation of the length of the drive Z3 is carried out such that the pivot point G30 still remains in the same plane. Thus essentially a radius correction is carried out here of the about the drive Z3 attached in an articulated manner to the drive frame.

To describe the equations of motion, with this apparatus two coordinate systems are used. On the one hand there is a body axis coordinate system with the origin in the central joint G00 and an inertial system. These coordinate systems run parallel to one another in the starting position of the platform, that is in horizontal alignment and at the respective zero position of the three possible angles.

The three possible rotation axes intersect at the point G00 of the Cardan joint, the arrangement of these axes corresponding to a 123 configuration. The apparatus according to the invention shown here in FIG. 1 accordingly permits rotation in three degrees of freedom by the three drives Z1, Z2 and Z3 about the origin in the central joint G00.

This results in the possibility of carrying out individual sequences of motion of various types without resetting the body to be examined, such as for example, a motor vehicle, between the individual types of movement. No rotation about one of the axes with respect to the round angle of 360° is necessary here, but all measurements can also be carried out, in particular through oscillating movement about an axis, for example, in an angular range of ±25° or less.

The execution of the measurements, for example of the mass, the position of the center of mass and the determination of the inertial sensor is thereby carried out as explained in more detail in the general part of the specification by a determination of the mass initially carried out, then based on the positioning of the drive link positions the determination of the position of the center of mass based on the plane of the support platform, and subsequently the determination of the height of the center of mass above the support platform based on a tilting with determination anew of the center of mass position in the plane. With the values that are given through the mass and through the center of mass vector, the inertia tensor can then be determined through solution of the corresponding equations of motion with a knowledge of the marginal conditions and the given values.

Figure 2:
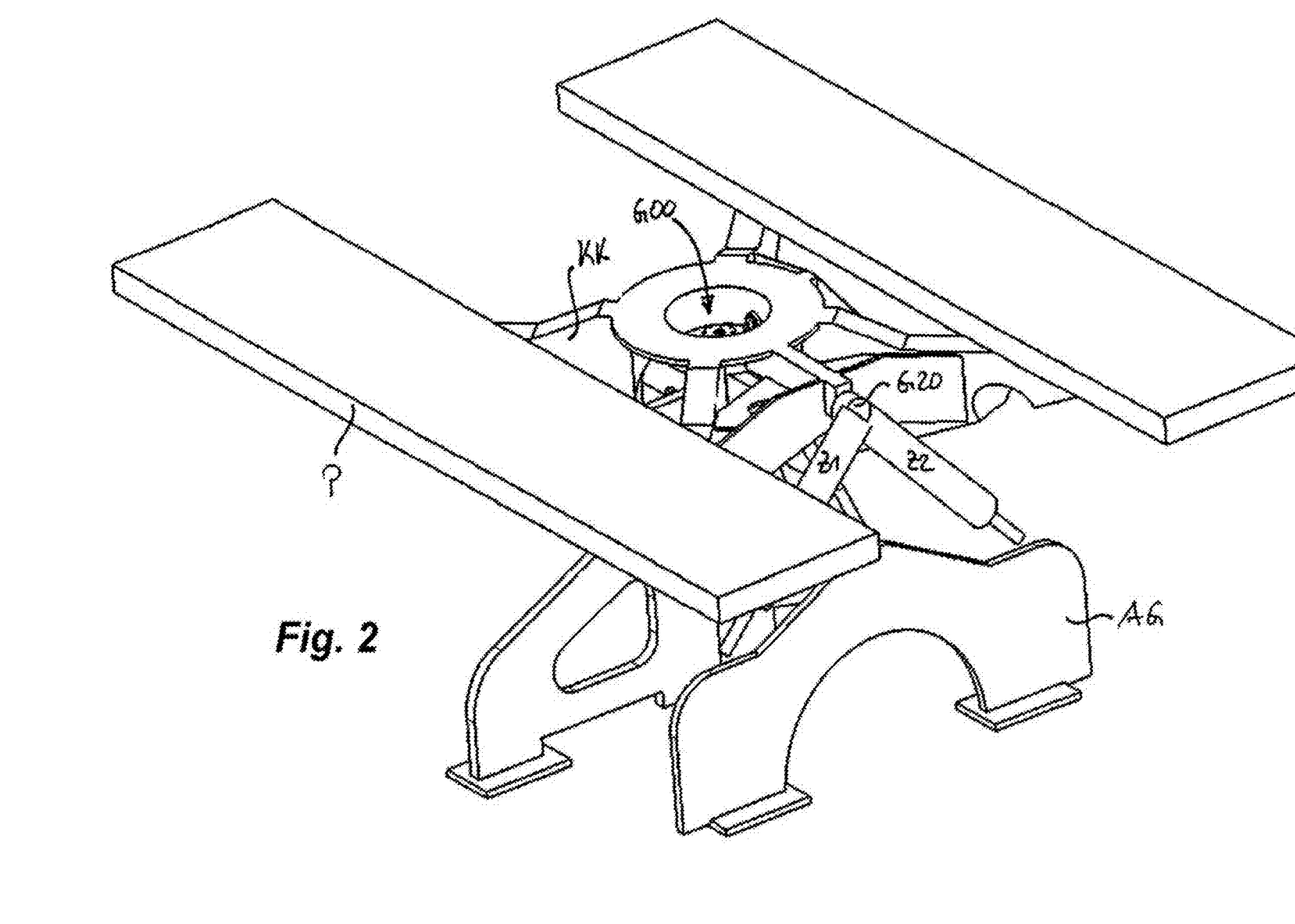
FIG. 2 is a perspective view of a concrete measuring apparatus.

FIG. 2 shows in a perspective top view a concrete structural embodiment of the apparatus according to the invention. Here a support platform P is seen that here is created essentially by two parallel support surfaces spaced apart at the track width of a vehicle, which support surfaces are connected to one another by a cross piece KK in whose middle the central joint G00 is provided. Furthermore, a support frame AG is provided under the platform P on frame essentially on one of the front faces of the support frame the two drives Z1 and Z2 are articulated spaced apart and have a common pivot point G20 on the support platform P. The further drive Z3 is not shown in this view.

Figure 3:
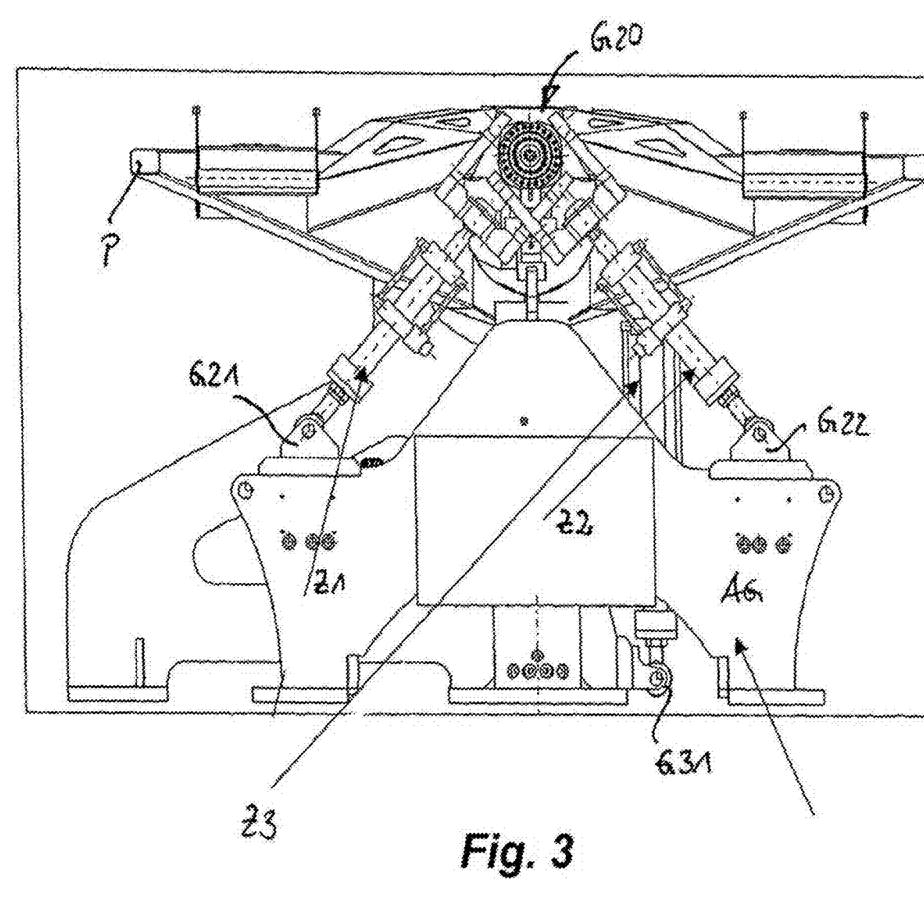
FIG. 3 is a side view of a measuring apparatus according to the invention.

FIG. 3 shows a side view of the apparatus according to the invention, in which the front face of the drive frame AG and the pivot points G21 and G22 of the drives Z1 and Z2 are shown. The two axes of the drives Z1 and Z2 here run at an angle of less than 90° to one another based on the horizontal position shown here of the support platform, in particular less than 84°. Furthermore the two drives Z1 and Z2 act in the common joint G20 on the support platform P.

Furthermore the drive Z3 is shown here, covered by the front face of the drive frame AG, which drive Z3 extends in the horizontal position of the support platform essentially vertically between the drive frame AG and the support platform P. The lower pivot point G31 is seen on the support platform.

Figure 4:
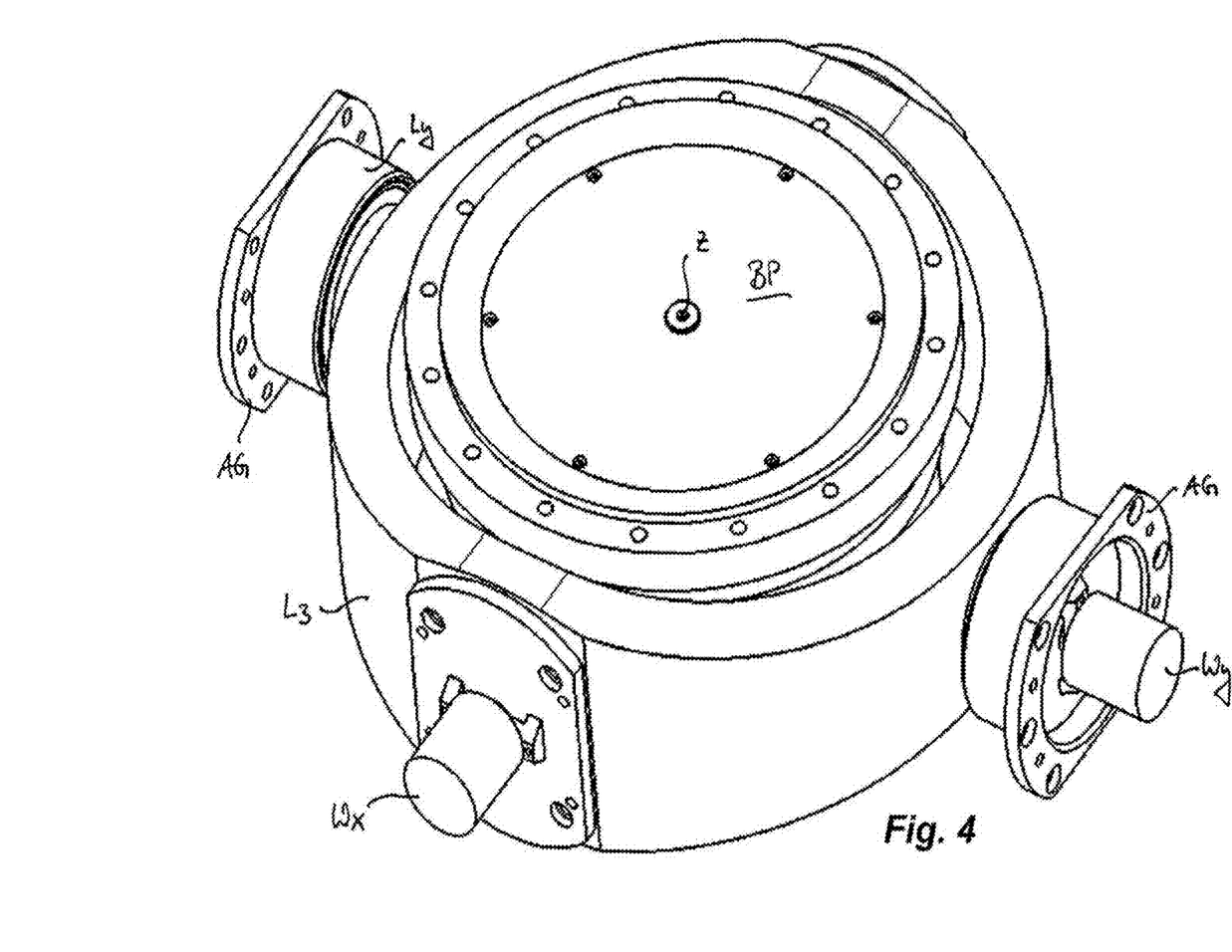
FIG. 4 shows the central joint in perspective.
Figure 5A:
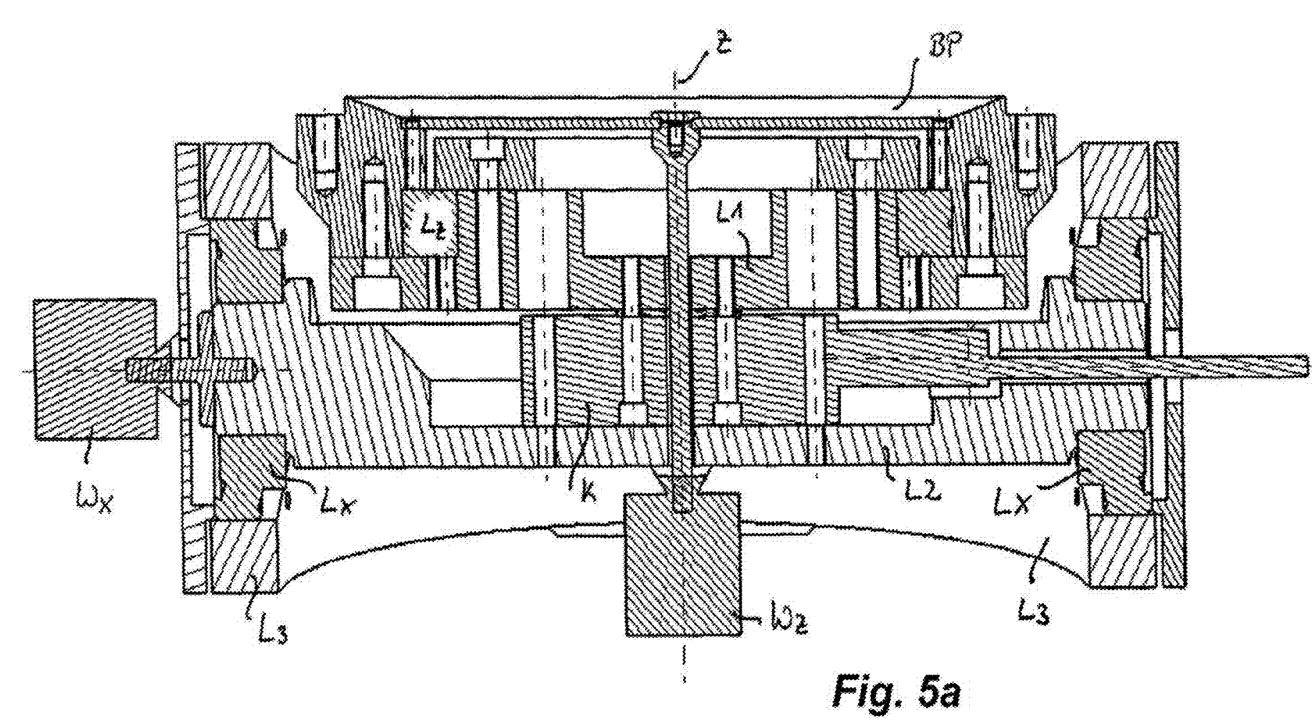
FIG. 5a is a first section through the central pivot joint.
Figure 5B:
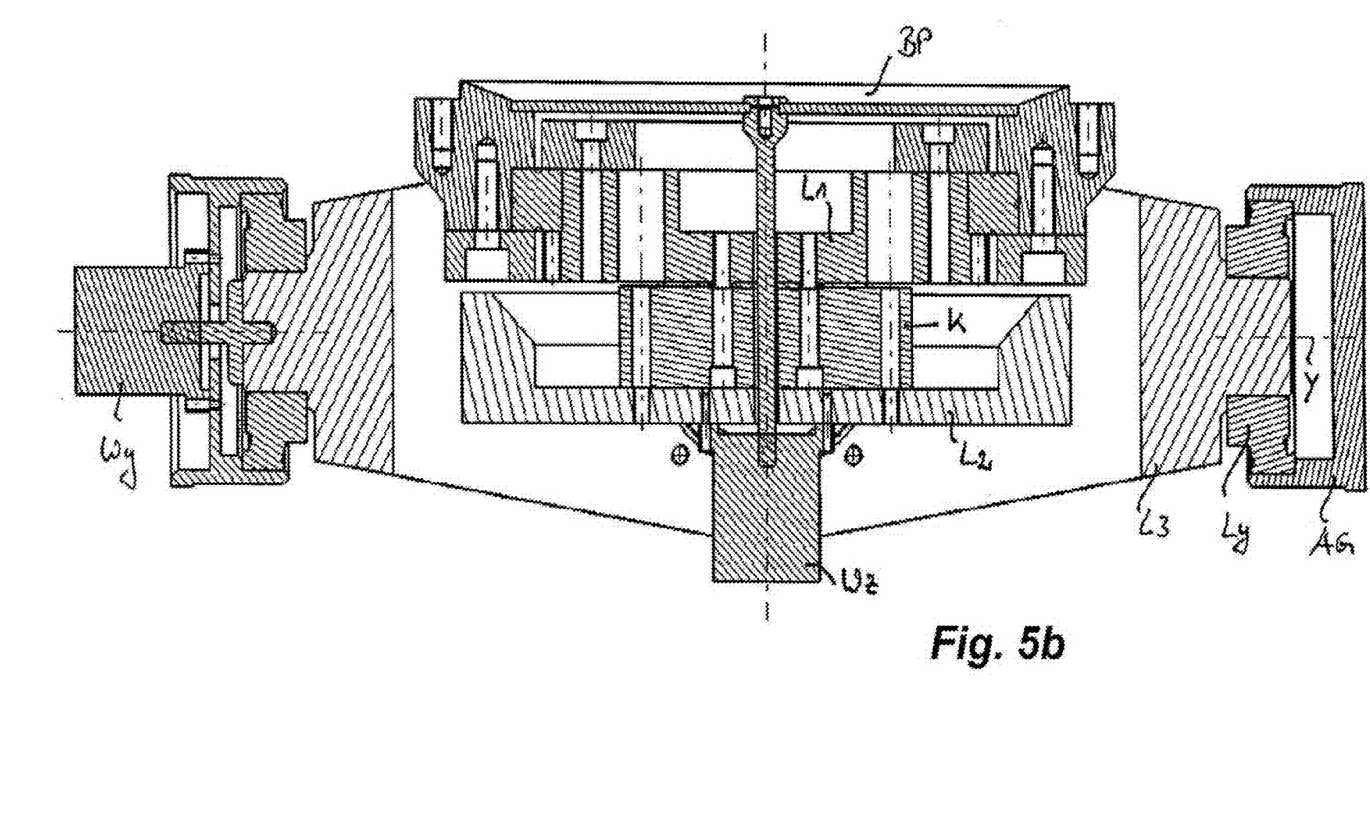
FIG. 5b is a second section through the central pivot joint.

FIG. 4 shows in a perspective top view the structure of the central joint, which is explained in more detail in two sectional drawings in FIGS. 5a and 5b.

With reference to FIGS. 5a and 5b, an attachment platform BP is shown here that is rotatable about a first bearing plate L1 about the vertical axis Z due to the bearing LZ provided coaxially between these components. In this embodiment the first bearing plate L1 is here provided essentially coaxial to the vertical axis Z inside the attachment platform BP. A force sensor K is attached to the bearing plate L1 and is connected to a second bearing plate L2 so that forces acting in the Z direction between the attachment platform BP and the second bearing plate L2 can be measured. The bearing plate L2 is rotatable around a first axis of rotation X, here oriented essentially horizontally in the bearing arrangement LX that forms a connection between the second bearing plate L2 and a third part L3 that with reference to FIG. 5 is rotatable by a bearing arrangement LY about a further axis in the Y direction. Via the bearing LY a connection is made to the drive frame AG either directly or via an intermediate component.

Thus an overall cardan structure results around the rotation axes X, Y and Z, wherein in this embodiment all of the rotation axes intersect at a common point centrally inside the force sensor K.

Each of the three axes is furthermore provided with an angle sensor WZ, WX or WY in order to be able to record the respective angle of rotation of these axes.

Figure 6:
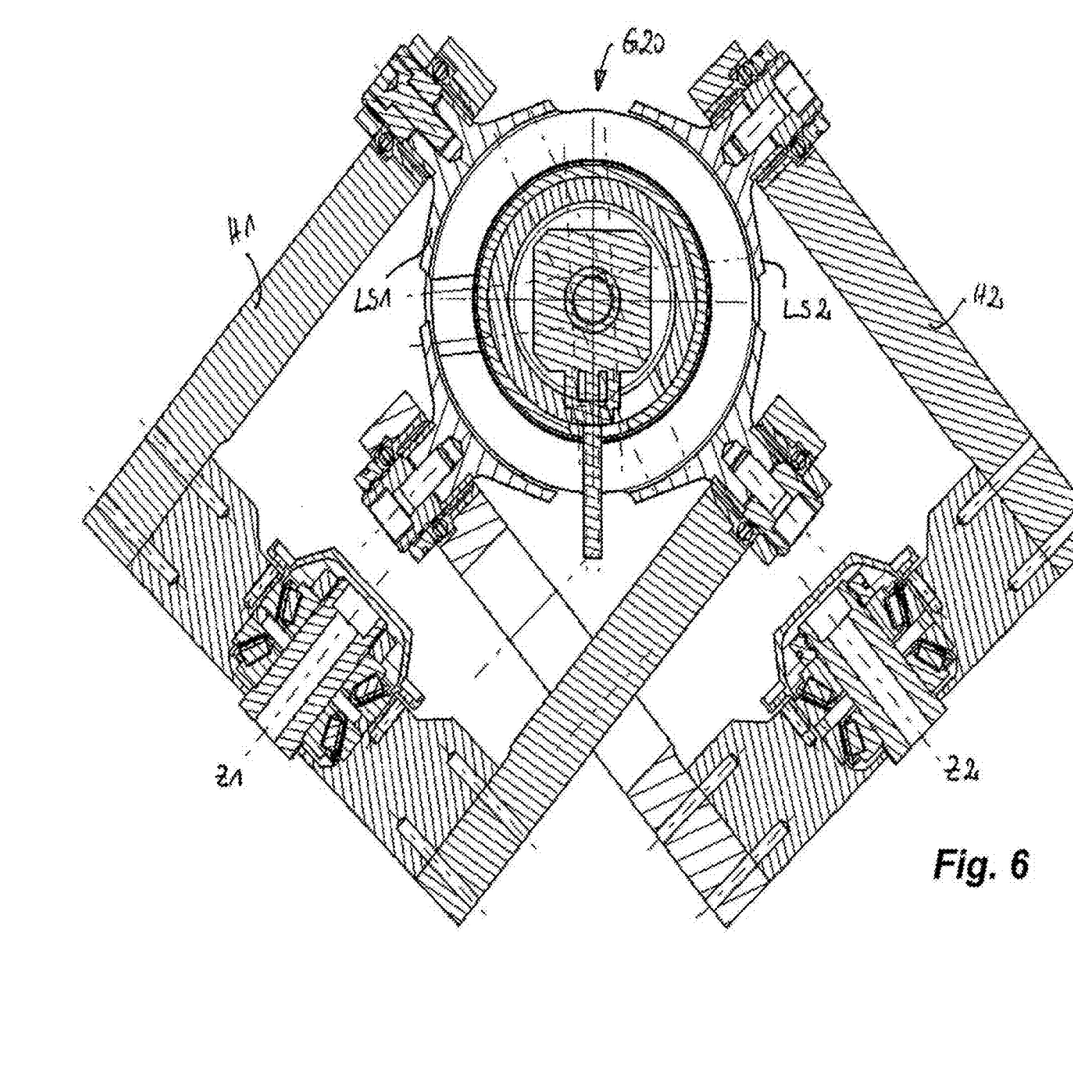
FIG. 6 is a side view of the common joint of two drives.

FIG. 6 shows in a side view of the axis of rotation the common pivot joint G20, wherein here the drive pistons of the two drives Z1 and Z2 are not shown to improve clarity. At the ends of the two drives Z1 and Z2 respective support brackets H1 and H2 are provided that act at two sides opposite one another on the bearing bushings LS1 and LS2, not shown in FIG. 6, in particular partially penetrate the brackets thereof.

Figure 7:
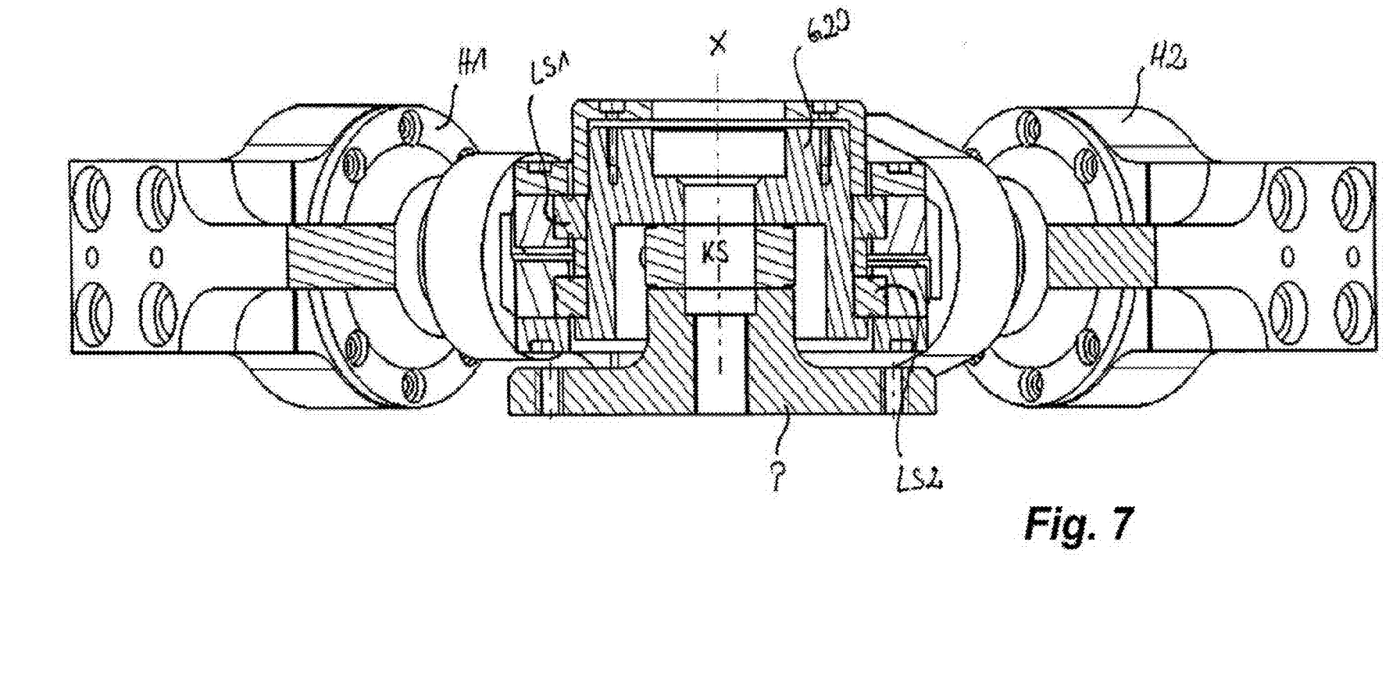
FIG. 7 is a sectional view parallel to the axis of rotation of the pivot joint.

A force sensor KS is here provided centrally and coaxially around the axis of rotation and can measure the forces acting along these three axes. The sectional view of FIG. 7 shows that the holders H1 or H2 act on bearing bushings LS1 and LS2 provided axially one behind the other. The bearing bushings are thereby provided coaxially around a joint part G20 assigned to the drive side, which joint part is connected to a component via the force sensor KS that is also provided coaxially to the axis of rotation X, which component is assigned to the support platform P. Thus a flexible joint results in the common joint G20 in which the respective acting forces can be recorded simultaneously in three axes.

Figure 8:
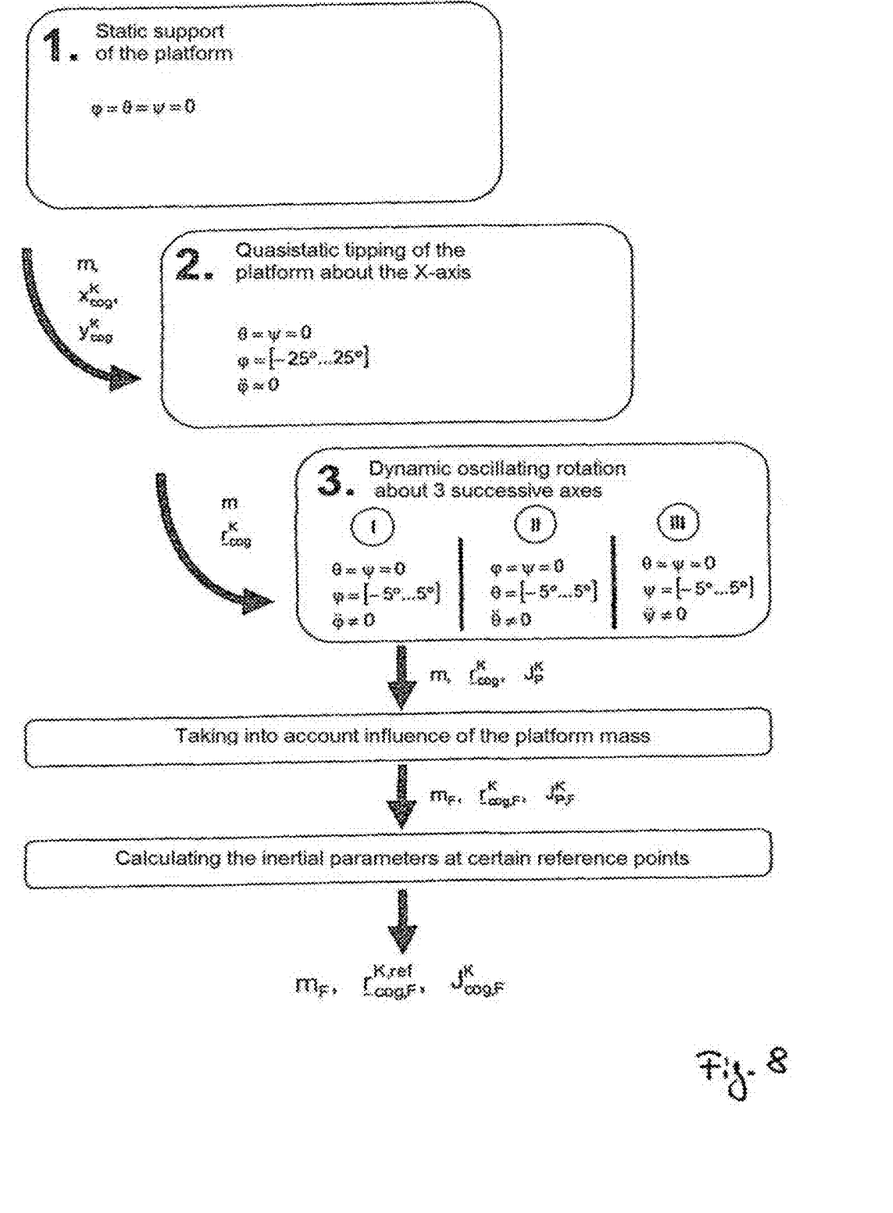
FIG. 8 is a flow chart of the measurement method.

FIG. 8 shows the measuring method in top view. In a first step with zero position of the angle of rotation, that is a horizontal alignment of the support platform, first the mass M is determined through force measurement in the three pivot positions and furthermore from the position of the three pivot positions the position of the center of mass in X direction or Y direction inside the plane of the support platform. A quasi-static tilting is then carried out in an angular range of ±25° about one of the axes, here about the X axis, wherein the position of the center of mass in the plane of the support platform is again determined and from the shift of this position the height of the center of mass above the support platform is deduced, so that the center of mass vector hereby results. With a knowledge of the mass and the center of mass vector, in a third step through a dynamic oscillating rotation about three axes, preferably successively one after the other, in angular ranges each of for example approx ±5° the inertia tensor can then be measured. Taking into account the influence from the platform mass, the mass of the measured body, the center of mass, and the inertia tensor can be hereby determined.

Figure 9:
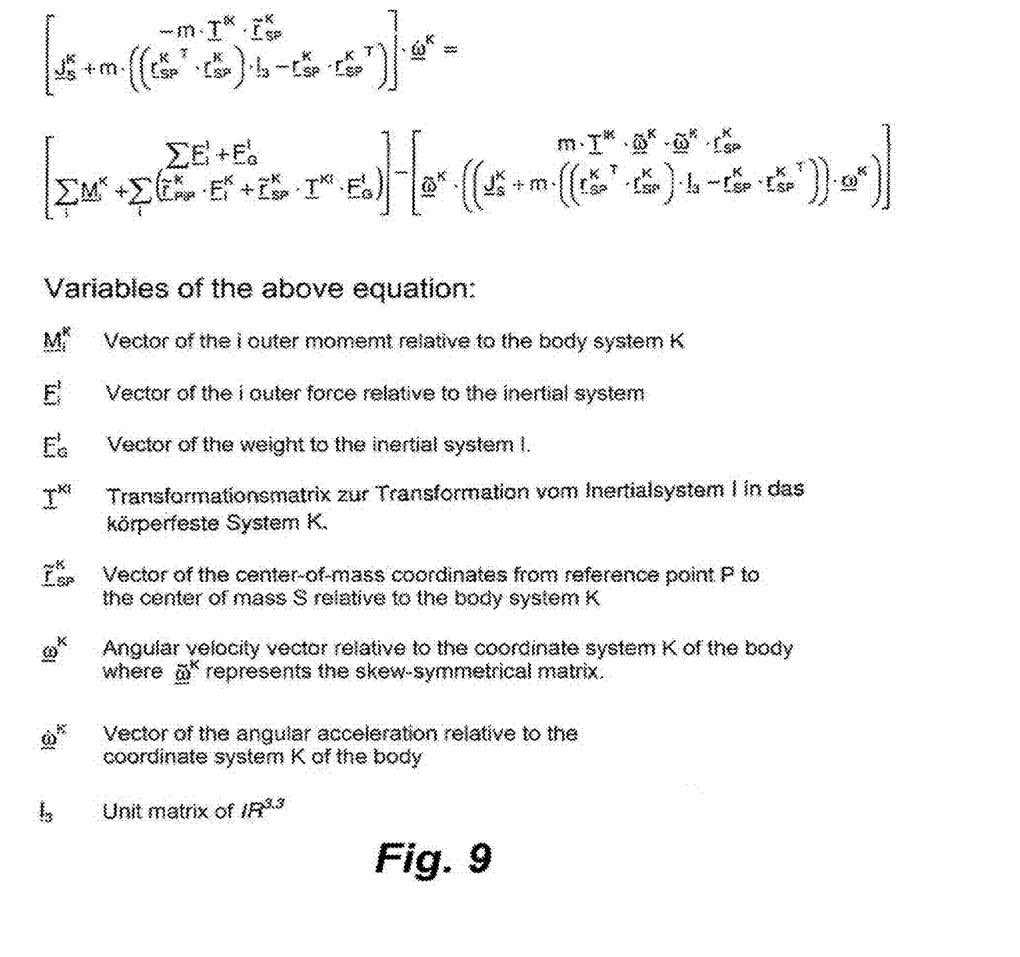
FIG. 9 shows the mathematical equation of the principle of conservation of angular momentum used with explanations.

FIG. 9 shows an overview of the mathematical equation used for describing the movement with corresponding explanation of the variables or vectors/tensors used. Depending on the marginal conditions, which are implemented during the movements carried out within the scope of the method according to the invention, this context shown here is simplified. With the measured values, such as angles, forces and the single or double differentiations thereof, the equation can be solved for the inertial parameters sought.

Figure 10:
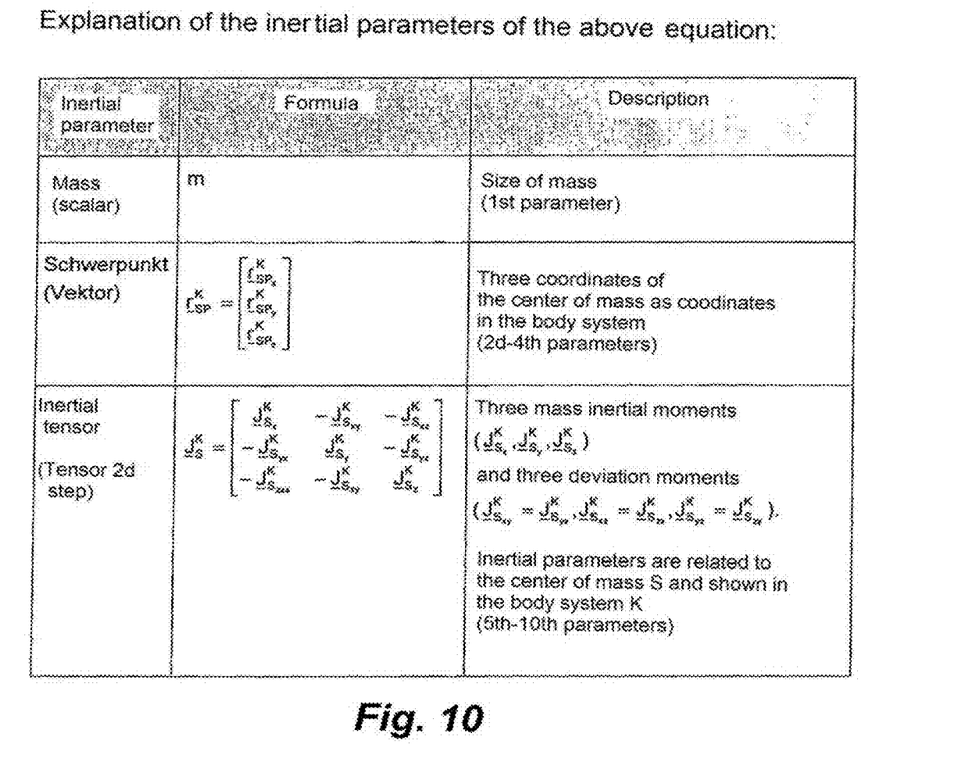
FIG. 10 is a description of the ten inertial parameters

The inertial parameters that are determined in the scope of this invention are additionally explained again in FIG. 10.

It is thus shown that with the apparatus according to the invention all essential inertial parameters of any body can be measured in a simple manner, in particular with a structurally simple apparatus operating rotationally and with a simple measurement method taking as a basis the equation of motion, as are given through the principle of conservation of angular momentum. The inertial parameters of unknown bodies can thus be measured or the inertial parameters of known bodies verified or checked.

The invention claimed is:

1. An apparatus for determining inertial parameters of a body, the apparatus comprising:
    a drive frame;
    a support platform on which the body can be positioned;
    a central spherical joint supporting the platform on the drive frame such that the support platform can be moved in three degrees of freedom;
    three respective drives; and
    drive joints spaced from the central joint and connecting the drives to the platform.

2. The apparatus according to claim 1, wherein only two of the drive joints are provided on the support platform and two of the drives act via a common one of these two drive joints on the platform.

3. The apparatus according to claim 2 wherein the two drives on the one common joint on the support platform are oriented to one another at an angle of less than 90° in a horizontal position of the support platform.

4. The apparatus according to claim 1 wherein the central joint is provided below an upper surface of the support platform.

5. The apparatus according to claim 1 wherein each of the joints or each of the drives is provided with at least one force sensor that can measure the force acting on the respective drive joint.

6. The apparatus according to claim 1 wherein the central joint is provided with at least one angular motion detector that can measure angular movements in three degrees of freedom.

7. The apparatus according to claim 1, further comprising a latch that can lock the central joint in a horizontal position of the support platform.

8. The apparatus according to claim 1 wherein the body on the support platform is a motor vehicle, the apparatus further comprising
    a fixed connection between the support platform and a door sill of the motor vehicle door to hold the vehicle in defined deflection positions.

9. The apparatus according to claim 2, wherein the common joint has
    an axis of rotation,
    a platform part coaxial to the axis and secured to the support platform,
    a joint part connected to the two drive,
    a force sensor provided between and connecting the platform and joint parts,
    two bearings on the joint part lying coaxially one behind the other, pivotal about the axis of rotation and connected to respective ones of the respective drives.

10. The apparatus according to claim 1, wherein the central joint has
    a mounting platform,
    a vertical axle on the mounting platform defining a first rotation axis,
    a first bearing plate rotatable on the vertical axle of the mounting platform, a second bearing plate, a load transducer connecting the second bearing plate to the first bearing plate, a cardan joint on the drive frame carrying the second bearing plate for movement about second and third axes perpendicular axes.

11. The apparatus according to claim 10 wherein the first, second, and third axes intersect at a common point in a center of the load transducer.

12. The apparatus according to claim 10, further comprising respective angular sensors associated with the first, second, and third axes of the central joint.

13. A method of determining the inertial parameters of a body using an apparatus according to claim 1, the method comprising the steps of:

moving the support platform and the body attached thereto in three degrees of freedom around a central rotation point, measuring forces in the drive joints and angles in the central joint, determining from the measured forces and angles inertial parameters of the body through the application of the principle of conservation of angular momentum.

14. The method according to claim 13, further comprising, in a first step, holding the body statically in a horizontal position of the support platform, and measuring a proportional weight of the body in each of the drive joints or in the drives by determining entire weight of the body by summing the forces measured in the drive joints or in the drives.

15. The method according to claim 13, further comprising the step of:

determining based on a coordinate system at whose origin the central joint is provided, from the position of the joints with respect to one another and forces measured in each joint or in the drives a position projected in a plane of the support platform, is of the center of mass of the body.

16. The method according to claim 15, further comprising the step of:

tilting the support platform in a predetermined angular range in at least one of the degrees of freedom from a horizontal position while measuring angles of a center of mass position in the platform plane determining from an angle-dependent shift of the center of mass a height or the position of the center of mass above the support platform plane.

17. The method according to claim 13, further comprising the steps of:

rotating, with knowledge of the center of mass position, the support platform about the three axes successively one after the other in respective predetermined angular ranges, recording acting forces in each of the joints or in the drives and an angle in the central joint, and determining inertial parameters from these measured values.

* * * * *